US012359349B2

(12) United States Patent
Kataoka et al.

(10) Patent No.: US 12,359,349 B2
(45) Date of Patent: Jul. 15, 2025

(54) METHOD FOR MANUFACTURING CARBON FIBER BUNDLE

(71) Applicant: Toray Industries, Inc., Tokyo (JP)

(72) Inventors: Takuya Kataoka, Otsu (JP); Naoto Hosotani, Ehime (JP); Takamitsu Hirose, Ehime (JP); Yusuke Kuji, Ehime (JP)

(73) Assignee: Toray Industries, Inc., Tokyo (JP)

( * ) Notice: Subject to any disclaimer, the term of this patent is extended or adjusted under 35 U.S.C. 154(b) by 531 days.

(21) Appl. No.: 17/911,776

(22) PCT Filed: Mar. 15, 2021

(86) PCT No.: PCT/JP2021/010303
§ 371 (c)(1),
(2) Date: Sep. 15, 2022

(87) PCT Pub. No.: WO2021/200061
PCT Pub. Date: Oct. 7, 2021

(65) Prior Publication Data
US 2023/0193522 A1 Jun. 22, 2023

(30) Foreign Application Priority Data
Mar. 30, 2020 (JP) ................................ 2020-059608

(51) Int. Cl.
*D01F 9/21* (2006.01)
*D01F 9/32* (2006.01)
(Continued)

(52) U.S. Cl.
CPC .................. *D01F 9/21* (2013.01); *D01F 9/32* (2013.01); *F27B 9/047* (2013.01); *F27B 9/40* (2013.01);
(Continued)

(58) Field of Classification Search
CPC ... D01F 9/21; D01F 9/32; D01F 9/225; D01F 9/00; D01F 9/08; D01F 9/12; D01F 9/14;
(Continued)

(56) References Cited

U.S. PATENT DOCUMENTS

2020/0354859 A1* 11/2020 Gooden .................... F27B 9/20

FOREIGN PATENT DOCUMENTS

JP 6099010 A 6/1985
JP 2013023801 A 2/2013
(Continued)

OTHER PUBLICATIONS

English Translation of the Written Opinion of the International Searching Authority in PCT/JP2021/010303 dated May 18, 2021 (Year: 2021).*
(Continued)

*Primary Examiner* — Daniel C. McCracken
(74) *Attorney, Agent, or Firm* — Buchanan Ingersoll & Rooney PC

(57) ABSTRACT

A method for manufacturing a carbon fiber bundle includes a stabilization process of subjecting an acrylic fiber bundle to a heat treatment within a range of 200° C. to 300° C. in an oxidizing atmosphere; a pre-carbonization process of performing a heat treatment within a range of 300° C. to 1,000° C. using a heat treatment furnace having at least one inert gas supply port on each of an incoming side and an outgoing side of the fiber bundle and at least one exhaust port between the incoming-side and outgoing-side inert gas supply ports, the heat treatment being performed with a temperature of an inert gas supplied being higher on the outgoing side than on the incoming side; and a carbonization process of performing a heat treatment at a temperature of 1,000° C. to 2,000° C. in an inert gas atmosphere, in which from a position at which an atmospheric temperature in the
(Continued)

heat treatment furnace is 300° C., the position being closest to the outgoing side in a machine length direction, up to the inert gas supply port on the incoming side, a flow of an inert atmosphere within the heat treatment furnace in the pre-carbonization process consists only of a flow in a parallel flow direction with respect to a travel direction of the fiber bundle in the machine length direction. Provided is a method for manufacturing a carbon fiber bundle by which manufacturing can be performed continuously for a long time by preventing entry into a temperature zone causing deposition of a gasified decomposition product, such as tar, that is generated at the time of the pre-carbonization treatment in manufacturing of carbon fibers and that stays within the heat treatment furnace.

3 Claims, 6 Drawing Sheets

(51) Int. Cl.
*F27B 9/04* (2006.01)
*F27B 9/40* (2006.01)
*F27D 7/02* (2006.01)

(52) U.S. Cl.
CPC .......... *F27D 7/02* (2013.01); *F27D 2007/023* (2013.01)

(58) Field of Classification Search
CPC .......... D01F 9/324; D01F 9/326; D01F 9/328; D01F 11/00; D01F 11/02; D01F 11/04; D01F 11/06; D01F 11/08; D01F 11/10; D01F 11/12; D01F 11/121; D01F 11/122; D01F 11/123; D01F 11/124; D01F 11/125; D01F 11/126; D01F 11/127; D01F 11/128; D01F 11/129; D01F 11/14; D01F 11/16; F27B 9/047; F27B 9/40; F27B 9/28; F27D 7/02; F27D 2007/023
See application file for complete search history.

(56) References Cited

FOREIGN PATENT DOCUMENTS

| | | | | |
|---|---|---|---|---|
| JP | 2014234557 A | | 12/2014 | |
| WO | WO 2019/084618 | * | 5/2019 | ................ F27B 5/04 |

OTHER PUBLICATIONS

International Search Report and Written Opinion for International Application No. PCT/JP2021/010303, dated May 18, 2021, 5 pages.

* cited by examiner

METHOD FOR MANUFACTURING CARBON FIBER BUNDLE

CROSS REFERENCE TO RELATED APPLICATIONS

This is the U.S. National Phase application of PCT/JP2021/010303, filed Mar. 15, 2021 which claims priority to Japanese Patent Application No. 2020-059608, filed Mar. 30, 2020, the disclosures of each of these applications being incorporated herein by reference in their entireties for all purposes.

FIELD OF THE INVENTION

Related is a method for manufacturing a carbon fiber bundle by which manufacturing can be performed continuously for a long time by preventing entry into a temperature zone causing deposition of a gasified decomposition product, such as tar, that is generated at the time of a pre-carbonization treatment in manufacturing of carbon fibers and that stays within a heat treatment furnace.

BACKGROUND OF THE INVENTION

Since carbon fibers have higher specific strength and specific elastic modulus than other reinforcing fibers, carbon fibers are industrially widely used as reinforcing fibers for composite materials in general industrial applications such as aerospace, sports, and bicycle, ship, and civil engineering and construction. In general, as a method for manufacturing a carbon fiber bundle from an acrylic fiber bundle, it is known to use an acrylonitrile fiber or the like as a precursor. It is obtained by performing a stabilization treatment in the range of 200° C. to 300° C. under an oxidizing atmosphere, then performing pre-carbonization in the range of 300° C. to 1,000° C. under an atmosphere of an inert gas such as nitrogen gas, and performing a carbonization treatment in the range of 1,000° C. or higher.

In the pre-carbonization treatment, gasified decomposition products such as hydrogen cyanide, ammonia, nitrogen, water, carbon dioxide, and tar are generated from the fiber bundle to be treated along with carbonization, and thus it is common to provide a furnace with an exhaust port for discharging these decomposition products. Among these decomposition products, in particular, the tar component is fixed to the inner wall of a heat treatment furnace, and when the tar component is accumulated in a certain amount or more, the tar component falls onto the traveling stabilized fiber bundle, resulting in a decrease in quality and a decrease in productivity of the obtained carbon fiber, such as a decrease in physical properties, an increase in fuzz, and occurrence of yarn break. In addition, there is the problem that the tar component is deposited on the inner wall of a duct from the exhaust port to a device for decomposing or combusting the exhaust gas to close a line, and the continuous production period is shortened.

In order to solve these problems, Patent Document 1 discloses that by regulating the residence time of the fiber bundle in the range of 250° C. to 400° C. in the pre-carbonization treatment, the temperature raising rate suitable for the decomposition product containing the tar component generated in the temperature range can be set, and the deposition of the generated decomposition product can be prevented.

Patent Document 2 discloses that by introducing a pre-heated inert gas in a predetermined volume into a heat treatment furnace in which a pre-carbonization treatment is performed, a decomposition product containing a tar component can be discharged from an exhaust port without being deposited.

PATENT DOCUMENTS

Patent Document 1: Japanese Patent Laid-open Publication No. 2014-234557

Patent Document 2: Japanese Patent Laid-open Publication No. S60-099010

SUMMARY OF THE INVENTION

However, according to findings by the present inventors, the method of Patent Document 1 is limited to the regulation of the temperature raising rate in a low temperature range, and deposition of the decomposition product containing the tar component generated in a high temperature range cannot be completely prevented.

In addition, the method of Patent Document 2 is effective for discharging the decomposition product containing the tar component in a gasified state, but since the temperature of the supplied inert gas is high and the temperature range of the treatment is narrow, the quality of the obtained carbon fiber is limited. In addition, the power cost for preheating the inert gas is high, and the manufacturing cost is excessively high.

Therefore, an object is to provide a method for manufacturing a carbon fiber bundle by which manufacturing can be performed continuously for a long time by preventing entry into a temperature zone causing deposition of a gasified decomposition product, such as tar, that is generated at the time of the pre-carbonization treatment in manufacturing of carbon fibers and that stays within the heat treatment furnace.

To solve the above-described problems, a method for manufacturing a carbon fiber bundle according to embodiments of the present invention has the following configuration. That is, the method for manufacturing a carbon fiber bundle includes a stabilization process of subjecting an acrylic fiber bundle to a heat treatment within a range of 200° C. to 300° C. in an oxidizing atmosphere; a pre-carbonization process of performing a heat treatment within a range of 300° C. to 1,000° C. using a heat treatment furnace having at least one inert gas supply port on each of an incoming side and an outgoing side of the fiber bundle and at least one exhaust port between the incoming-side and outgoing-side inert gas supply ports, the heat treatment being performed with a temperature of an inert gas supplied being higher on the outgoing side than on the incoming side; and a carbonization process of performing a heat treatment at a temperature of 1,000° C. to 2,000° C. in an inert gas atmosphere, in which from a position at which an atmospheric temperature in the heat treatment furnace is 300° C., the position being on the most outgoing side in a machine length direction, up to the inert gas supply port on the incoming side, a flow of an inert atmosphere within the heat treatment furnace in the pre-carbonization process consists only of a flow in a parallel flow direction with respect to a travel direction of the fiber bundle in the machine length direction.

In the method for manufacturing a carbon fiber bundle according to embodiments of the present invention, the pre-carbonization process is performed in the heat treatment furnace having three or more sections in which temperature control is possible in the machine length direction, and it is preferable that the temperature of the inert gas supplied to the heat treatment furnace satisfies the following two conditions, where $T_1$ [° C.] represents an atmospheric temperature at a fiber bundle height at a central position in the machine length direction in a section that is on the most incoming side with respect to the machine length direction of the heat treatment chamber, and $T_2$ [° C.] represents an atmospheric temperature at a fiber bundle height at a central position in the machine length direction in a section that is on the most outgoing side with respect to the machine length direction of the heat treatment chamber.

Temperature range of inert gas supplied on incoming side [° C.]: $|T_1-(\text{temperature of inert gas supplied on incoming side})|=\Delta T_1 \leq 50$ Temperature range of inert gas supplied on outgoing side [° C.]: $|T_2-(\text{temperature of inert gas supplied on outgoing side})|=\Delta T_2 \leq 100$ In the method for manufacturing a carbon fiber bundle according to the present invention, it is preferable that the cross-sectional area be substantially uniform in the machine length direction in the heat treatment furnace in the pre-carbonization process and that the absolute value ratio ($|V_1|/|V_2|$) of a flow speed $V_1$ described below and a flow speed $V_2$ described below satisfy $0.5 \leq |V_1|/|V_2| \leq 2.0$.

$V_1$ [m/s]: The flow speed of the inert atmosphere in the horizontal direction at the central position in the machine length direction of the section that is on the most incoming side with respect to the machine length direction of the heat treatment chamber $V_2$ [m/s]: The flow speed of the inert atmosphere in the horizontal direction at the central position in the machine length direction of the section that is on the most outgoing side with respect to the machine length direction of the heat treatment chamber The effect is provided that manufacturing can be performed continuously for a long time by preventing entry into a temperature zone causing deposition of a gasified decomposition product, such as tar, that is generated at the time of the pre-carbonization treatment in manufacturing of carbon fibers and that stays within the heat treatment furnace.

BRIEF DESCRIPTION OF THE DRAWINGS

in FIG. 1 is a flow in a parallel flow direction with respect to a traveling direction of a fiber bundle.

in FIG. 1 includes flows in 2 directions, that is, the parallel flow direction and a counter flow direction with respect to the traveling direction of the fiber bundle.

DETAILED DESCRIPTION OF EMBODIMENTS OF THE INVENTION

Hereinafter, the present invention will be described in detail.

In the present invention, a known acrylic fiber bundle can be used. As an acrylonitrile polymer constituting the acrylic fiber bundle, a homopolymer of acrylonitrile or a copolymer of acrylonitrile and another monomer can be used.

The acrylic fiber bundle is heat-treated in an oxidizing atmosphere at 200 to 300° C. to be subjected to a stabilization treatment, thereby obtaining a stabilized fiber bundle.

The stabilized fiber bundle is subjected to a pre-carbonization treatment in an inert atmosphere at 300° C. to 1,000° C. to obtain a pre-carbonized fiber bundle. As an inert gas, a known inert atmosphere such as nitrogen, argon, and helium can be employed, but nitrogen is preferable from the viewpoint of economic efficiency. The maximum temperature of the pre-carbonization treatment is preferably 500 to 1,000° C., more preferably 600 to 900° C.

When the maximum temperature of the pre-carbonization treatment is 500° C. or higher, the carbon fiber is further improved in appearance of tensile strength and tensile modulus. When the maximum temperature of the pre-carbonization treatment is 1,000° C. or lower, the cost of the heat treatment furnace is easily reduced, which is industrially advantageous. As the temperature distribution of the heat treatment furnace, the maximum temperature is preferably on the outgoing side of the furnace, and the inert atmospheric temperature is higher on the outgoing side than on the incoming side.

Figure 1:
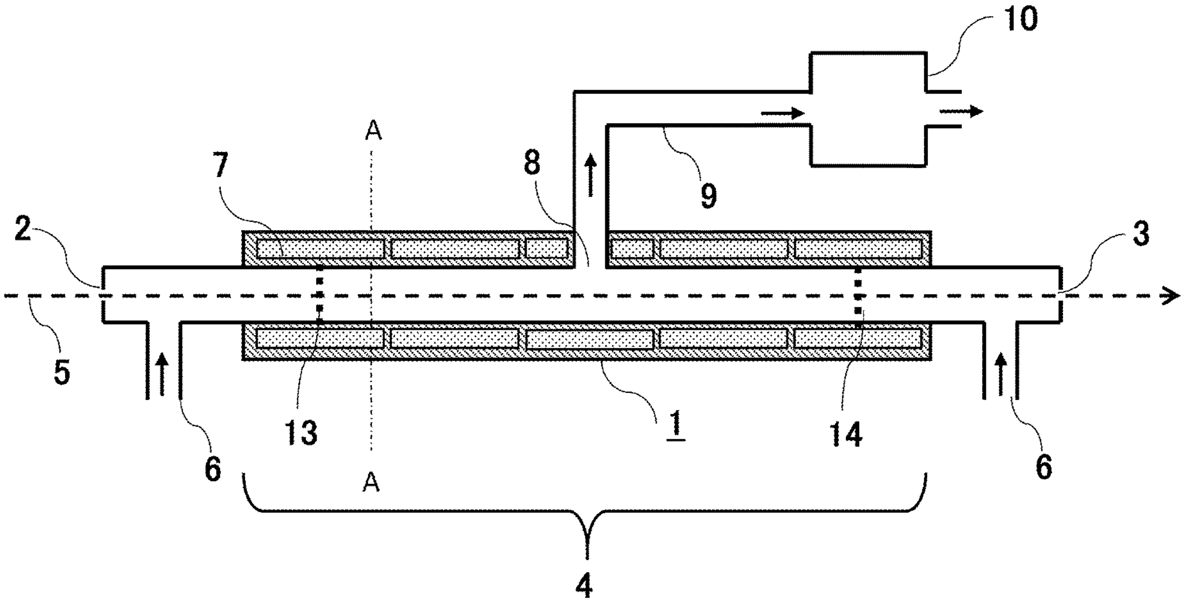
FIG. 1 is a schematic configuration diagram in a machine length direction of a heat treatment furnace in which a pre-carbonization treatment is performed used in an embodiment of the present invention.

The heat treatment furnace used for the pre-carbonization treatment is not particularly limited. For example, as shown in FIG. 1, it is preferable that a heat treatment furnace (1) have an incoming port (2) on one side and an outgoing port (3) on the other side, that openings be provided in closing plates of the incoming port and the outgoing port, and that an opening area be minimized, and a heat treatment furnace (1) having a seal mechanism such as a labyrinth seal structure for preventing inflow of oxygen or the like into a heat treatment chamber (4) is preferably used. Inert gas supply ports (6) are provided on the incoming side and the outgoing side of a fiber bundle (bundle to be treated) (5). It is preferable that the heat treatment chamber (4) have a substantially uniform cross-sectional area with respect to the machine length direction and have a structure in which the flow speed of the inert gas present in the heat treatment chamber (4) does not rapidly change. The temperature of the inert atmosphere is controlled by heaters (7) provided above and below the heat treatment furnace (1). In order to accurately control the temperature of the inert atmosphere, it is desirable that the heat treatment furnace have three or more sections in which the temperature can be controlled in the machine length direction. If the number of sections is less than three, the temperature of the inert atmosphere may not be accurately controlled. In addition, an exhaust port (8) is provided to efficiently discharge a decomposition product produced by gasification of tar or the like to the outside of the furnace, and the decomposition product is subjected to thermal degradation in an exhaust gas treatment furnace (10) via an exhaust air duct (9) the temperature of which is kept.

Figure 2:
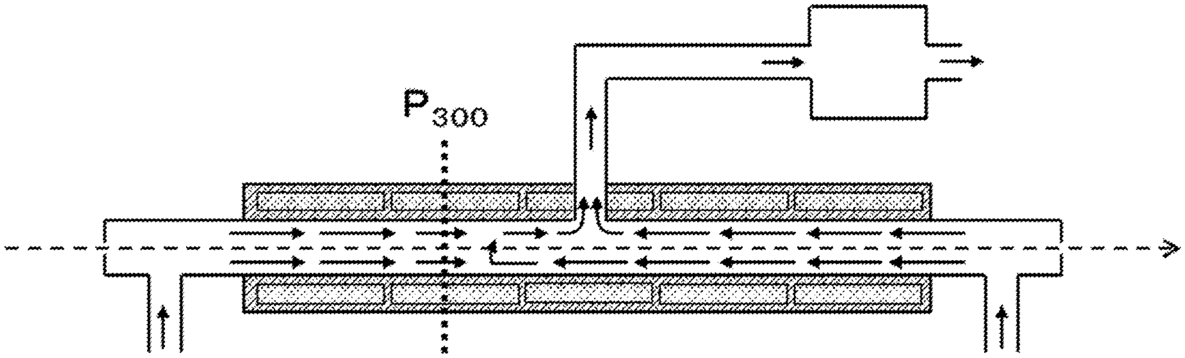
FIG. 2 is a schematic cross-sectional view taken along the machine length direction in which a flow of an inert atmosphere from an incoming port to a position on the most outgoing side in the machine length direction at which the atmospheric temperature in the heat treatment furnace is 300° C.
Figure 3:
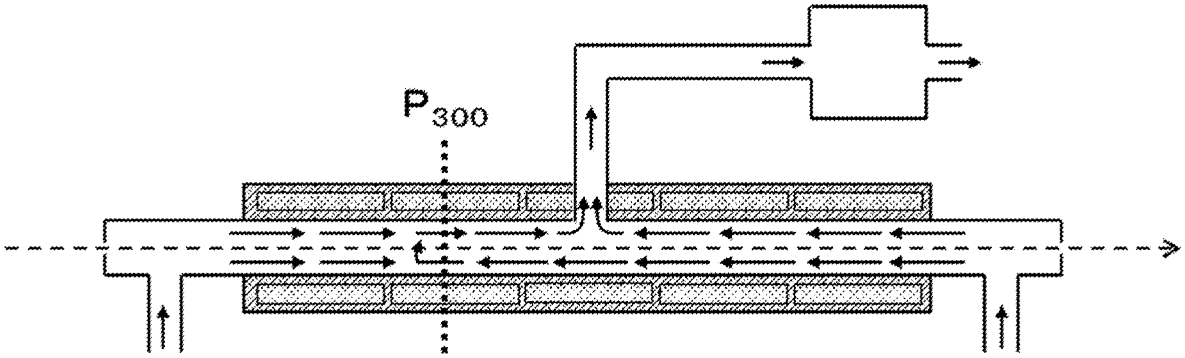
FIG. 3 is a schematic cross-sectional view taken along the machine length direction in which the flow of the inert atmosphere from the incoming port to a position on the most outgoing side in the machine length direction at which the atmospheric temperature in the heat treatment furnace is 300° C.
Figure 4:
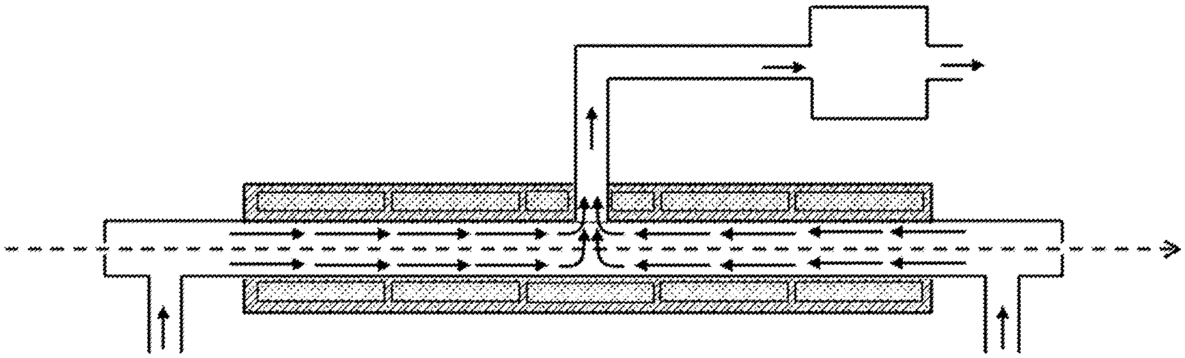
FIG. 4 is a schematic cross-sectional view taken along the machine length direction in which the flow of the inert atmosphere from an entrance to an exhaust port in FIG. 1 is a flow in the parallel flow direction with respect to the traveling direction of the fiber bundle.

The atmospheric temperature in the heat treatment chamber (4) used for the pre-carbonization treatment is an important factor for preventing deposition of a decomposition product produced by gasification of tar or the like. In the pre-carbonization treatment, gasified decomposition products such as hydrogen cyanide, ammonia, nitrogen, water, carbon dioxide, and tar are generated. A tar component includes a compound having a melting point or a boiling point near 300° C. Since most part of the tar component is generated at an atmospheric temperature higher than 300° C., there is a possibility that the tar component is deposited unless the decomposition gas is prevented from moving from the generation place to a place where the atmospheric temperature is lower than 300° C. and is discharged from the place where the atmospheric temperature is 300° C. or higher to the outside of the furnace through the exhaust port (8). Since the treatment temperature is gradually raised in the pre-carbonization treatment, the inert atmospheric temperature in the heat treatment chamber (4) is higher on the outgoing side than on the incoming side. In order to prevent the decomposition gas generated at an atmospheric temperature of 300° C. or higher from moving to the incoming side at less than 300° C., the flow of the atmosphere in the furnace to a position ($P_{300}$) on the most outgoing side in the machine length direction at which the atmospheric temperature in the heat treatment furnace is 300° C. needs to be only the flow in the parallel flow direction with respect to the traveling direction of the fiber bundle. When there is a flow in a counter flow direction, the tar component may move to a place at lower than 300° C. and is deposited. In order to cause the flow of the inert atmosphere up to the position ($P_{300}$) where the atmospheric temperature is 300° C. to be the flow in the parallel flow direction with respect to the traveling direction of the fiber bundle, it is preferable to provide a device configuration having the inert gas supply port (6) in a place where the atmospheric temperature is lower than 300° C. and the exhaust port (8) in a place where the atmospheric temperature is 300° C. or higher, and it is more preferable to provide the exhaust port (8) in a place where the atmospheric temperature is 350° C. or higher. FIG. 2 shows an example in which the flow of the inert atmosphere from the inert gas supply port (6) on the incoming side to the position ($P_{300}$) where the atmospheric temperature is 300° C. is only the flow in the parallel flow direction with respect to the traveling direction of the fiber bundle, and FIG. 3 shows an example in which the flow of the inert atmosphere on the incoming side from the inert gas supply port (6) on the incoming side to the position ($P_{300}$) where the atmospheric temperature is 300° C. includes flows in 2 directions, that is, the parallel flow direction and the counter flow direction with respect to the traveling direction of the fiber bundle. It is more preferable that the flow of the inert atmosphere from the inert gas supply port (6) on the incoming side to the exhaust port (8) illustrated in FIG. 4 be only in the parallel flow direction with respect to the traveling direction of the fiber bundle.

Since the flow of the inert atmosphere in the heat treatment furnace varies with temperature, when there is a temperature difference of the atmosphere of the heat treatment chamber (4) in the vertical direction, the hot atmosphere stays in the upper part due to buoyancy, and the cooler atmosphere stays in the lower part. At that time, there is a possibility that a decomposition product produced by gasification of tar or the like stays in the heat treatment chamber (4) without reaching the exhaust port (8) and that the flow of the inert atmosphere moves in the counter flow direction with respect to the traveling direction of the fiber bundle to deposit the tar component. Therefore, it is desirable that there is no large deviation between the atmospheric temperature of the heat treatment chamber (4) and the temperature of the supplied inert gas to be introduced into the furnace, and it is preferable that the temperature of the inert gas supplied to the heat treatment furnace satisfies the following two conditions, where $T_1$ [° C.] represents an atmospheric temperature at a fiber bundle height at a central position (13) in the machine length direction in a section that is on the most incoming side with respect to the machine length direction of the heat treatment chamber (4), and $T_2$ [° C.] represents an atmospheric temperature at a fiber bundle height at a central position (14) in the machine length direction in a section that is on the most outgoing side with respect to the machine length direction of the heat treatment chamber (4).

Temperature range of inert gas supplied on incoming side [° C.]: $|T_1-(\text{temperature of inert gas supplied on incoming side})|=\Delta T_1 \leq 50°$ C.

Temperature range of inert gas supplied on outgoing side [° C.]: $|T_2-(\text{temperature of inert gas supplied on outgoing side})|=\Delta T_2 \leq 100$ The atmospheric temperature at the central position (13) is appropriate as the atmospheric temperature of the heat treatment chamber (4) for comparison with the inert gas supply temperature on the incoming side. The temperature of the supplied inert gas on the outgoing side is similarly appropriate as the atmospheric temperature at the central position (14).

Furthermore, the flow speed balance of the inert gas on the incoming side and outgoing side is important for the flow of the inert atmosphere in the heat treatment furnace. The absolute value ratio ($|V_1|/|V_2|$) of the flow speeds of the inert atmosphere in the horizontal direction between the incoming side and the outgoing side is preferably 0.5 or more and 2.0 or less ($0.5 \leq |V_1|/|V_2| \leq 2.0$). When the absolute value ratio $|V_1|/|V_2|$ between the flow speed ($V_1$) of the inert atmosphere in the horizontal direction on the incoming side and the flow speed ($V_2$) of the inert atmosphere in the horizontal direction on the outgoing side is within the above preferable range, the inert gas supplied from the outgoing side is discharged to the exhaust port without flowing back to the incoming side, and there is no possibility that the tar component flows into the incoming side. When the flow of the inert gas is in the same direction as the travelling direction of the yarn, the values of $V_1$ and $V_2$ become positive values, and when the flow is in a direction opposite to the travelling direction of the yarn, the values of $V_1$ and $V_2$ become negative values. It is preferable that the flow speed ratio be an actual flow speed, and it is desirable that positions serving as references of flow speeds on the incoming side and the outgoing side be the central position (13) of the section on the most incoming side in the machine length direction on the incoming side and the central position (14) of the section on the most outgoing side in the machine length direction on the outgoing side and that the flow speeds of the inert atmosphere in the horizontal direction at the positions (13 and 14) be calculated from the flow rate of the supplied inert gas and the wind speeds at the openings of the incoming port (2) and the outgoing port (3) of the heat treatment furnace.

The pre-carbonized fiber bundle is subjected to a carbonization treatment in an inert atmosphere at 1,000° C. to 2,000° C. to obtain a carbonized fiber bundle.

The carbon fiber bundle may be subjected to an electrolytic oxidation treatment or an oxidation treatment for the purpose of improving affinity with a fiber-reinforced composite material matrix resin and adhesiveness thereto, if necessary.

EXAMPLES

Hereinafter, the present invention will be specifically described by way of examples, but the present invention is not limited to these examples. Various measurement methods performed in examples are as follows.

<Dynamic Pressure Measurement>

Figure 5:
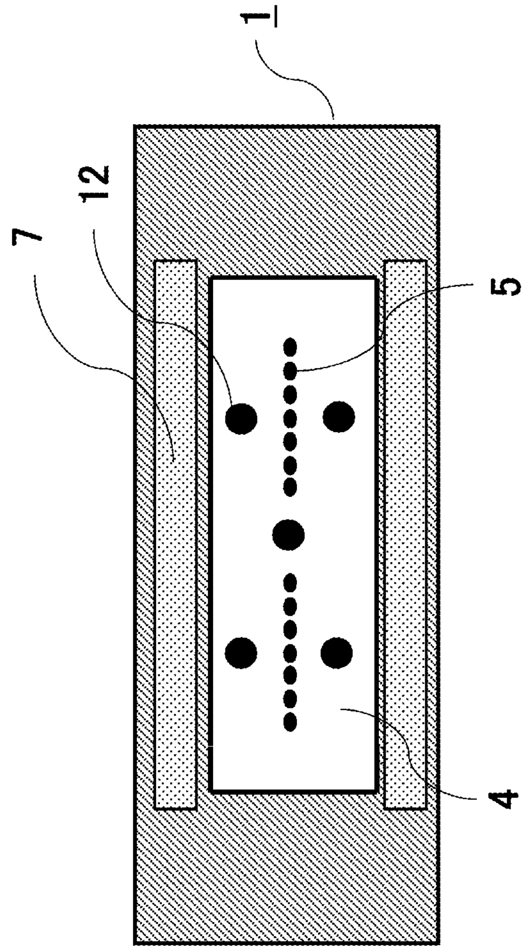
FIG. 5 is a cross-sectional view taken along the line A-A of FIG. 1.

A Straight Pitot tube (manufactured by OKANO WORKS, LTD., trade name: 2-hole pitot tube, produced by order, outer shape: ø 10 mm) to which a digital differential pressure gauge (manufactured by Testo SE & Co. KGaA, trade name: testo 512-3, measurement range: 0 Pa to 200 Pa) was connected was inserted into the furnace from an opening (11) of the incoming port, and the tip of the pitot tube was moved in parallel to the machine length direction to perform pressure measurement at 5 measurement points (3 points in the machine width direction and 3 points in the height direction) (12) of a cross section in the furnace in the machine width direction in FIG. 5. The total pressure was measured with the tip of the pitot tube, the static pressure was measured with the side, and the presence or absence of the dynamic pressure was determined from the pressure difference. When the dynamic pressure was not sensed up to the position ($P_{300}$) where the atmospheric temperature was 300° C., it was determined that the flow of the inert atmosphere was only the flow in the parallel flow direction with respect to the traveling direction of the fiber bundle, and when the dynamic pressure was sensed, it was determined that the flow of the inert atmosphere included flows in 2 directions, that is, the parallel flow direction and the counter flow direction with respect to the traveling direction of the fiber bundle.

<Measurement of Inert Atmospheric Temperature in Heat Treatment Furnace>

A sheathed thermocouple (manufactured by FUKUDEN INCORPORATED, outer shape: ø 1.6 mm, material: SUS 316) was attached to a wire stretched in the openings (11) from the incoming port to the outgoing port, and the atmospheric temperature was measured at the 5 measurement points (12) in the cross section of the heat treatment furnace in the machine width direction shown in FIG. 5 by moving the tip, which is a measurement site, of the thermocouple in the machine length direction (measured every 100 mm). When the atmospheric temperature at the fiber bundle height was measured, the wire to which the thermocouple was attached was set to the height of the fiber bundle, and the tip of the thermocouple was aligned with the measurement point to perform measurement at the three points in the machine width direction shown in FIG. 6. The tip of the wire was weighted and tensioned so that the wire and thermocouple did not hang down.

<Method for Calculating Flow Speeds ($V_1$ and $V_2$) of Inert Atmosphere in Horizontal Direction in Heat Treatment Furnace>

Figure 6:
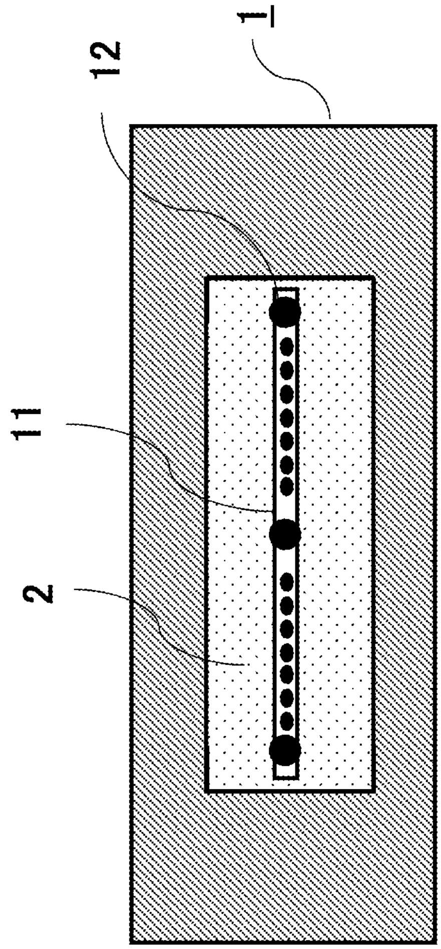
FIG. 6 is a schematic configuration diagram of the incoming port of the heat treatment furnace according to the present invention.

The wind speed in the immediate vicinity of the opening (11) of the incoming port (2) was measured at the 3 measurement points (12) in the machine width direction shown in FIG. 6 using an Anemomaster wind meter at a high temperature (product number: 6162 manufactured by KANOMAX JAPAN INC., heat resistant temperature: 500° C.). The average value of the measurement results for 15 seconds was taken as the wind speed ($V_{out}$) of the inert atmosphere flowing out of the furnace from the opening (11). From the measured wind speed ($V_{out}$) and the area of the opening, the flow rate of the inert atmosphere exiting the furnace from the opening (11) per unit time was determined, and from the difference in the flow rate of the inert atmosphere from the inert gas supply port on the incoming side per unit time, the flow rate per unit time in the traveling direction of the fiber bundle in the heat treatment furnace was calculated. The flow speed ($V_1$) of the inert atmosphere in the horizontal direction on the incoming side was calculated from the flow rate and the cross-sectional area of the heat treatment furnace (1) in the machine width direction. The flow speed ($V_2$) of the inert atmosphere in the horizontal direction on the outgoing side was also calculated by the same method.

<Criteria of Fuzz Quality of Carbon Fiber Bundle>

The quality criteria in examples and comparative examples were as follows.

Excellent: A level at which the number of fuzzes of 10 mm or more on the fiber bundle that can be visually confirmed after the fiber bundle exits the pre-carbonization process is 5/m or less on average, and the fuzz quality does not affect the passability in the process and the high-order processability as a product at all.

Good: A level at which the number of fuzzes of 10 mm or more on the fiber bundle that can be visually confirmed after the fiber bundle exits the pre-carbonization process is more than 5/m and less than 10/m on average, and the fuzz quality has almost no influence on the passability in the process and the high-order processability as a product.

Poor: A level at which the number of fuzzes of 10 mm or more on the fiber bundle that can be visually confirmed after the fiber bundle exits the pre-carbonization process is 10/m or more on average, and the fuzz quality has an adverse effect on the passability in the process and the high-order processability as a product.

<Criteria of Environment of Inside Heat Treatment Furnace & Exhaust Air Duct>

The criteria of the environment of inside heat treatment furnace & exhaust air duct in the examples and the comparative examples were as follows.

Excellent: A level at which there is no trace of adhesion of the solidified tar component in the heat treatment furnace or the exhaust air duct, and there is no influence on the operation at all.

Good: A level at which there are few traces of adhesion of the solidified tar component in the heat treatment furnace and the exhaust air duct, and there is almost no influence on the operation.

Poor: A level at which there are many traces of adhesion of the solidified tar component in the heat treatment furnace and the exhaust air duct, which causes blockage of the furnace and the duct and hinders operation.

Example 1

Stabilized fiber bundles obtained by heat-treating 100 aligned fiber bundles each including 20,000 single fibers having a single fiber fineness of 0.11 tex at 240° C. to 280° C. in air was continuously passed through a heat treatment furnace having a shape as shown in FIG. 1 and an effective heat treatment length of 4 m retained at a maximum temperature of 700° C. at a yarn speed of 1.0 m/min to provide a pre-carbonized fiber bundle. As the inert gas filling the heat treatment furnace, nitrogen was preheated on both the incoming side and the outgoing side and supplied from the inert gas supply port provided on each side, and the atmospheric temperature at the exhaust port position was set to 500° C. The obtained pre-carbonized fiber bundles were then heat-treated at a maximum temperature of 1,500° C. in a carbonization furnace, and a sizing agent was applied after an electrochemical treatment of fiber surface to provide carbon fiber bundles.

At this time, from the dynamic pressure measurement result, it was determined that the flow of the inert atmosphere from the position ($P_{300}$) on the most outgoing side in the machine length direction at which the atmospheric temperature in the heat treatment furnace was 300° C. to the inert gas supply port on the incoming side was only in the parallel flow direction with respect to the traveling direction of the fiber bundles. The difference ($\Delta T_1$) between the atmospheric temperature ($T_1$) at the height of the fiber bundles at the central position in the machine length direction in the section on the most incoming side and the supply temperature of nitrogen on the incoming side was 150° C., and the difference ($\Delta T_2$) between the atmospheric temperature ($T_2$) at the height of the fiber bundles at the central position in the machine length direction in the section on the most outgoing side and the supply temperature of nitrogen on the outgoing side was 150° C. The absolute value ratio ($|V_1|/|V_2|$) of the flow speeds of the inert atmosphere in the horizontal direction between the incoming side and the outgoing side was 2.5. Under the above conditions, continuous operation was performed for 10 days without causing a serious problem during production. In addition, as a result of visually observing the obtained pre-carbonized fiber bundles and carbon fiber bundles, the fuzz quality of the carbon fiber bundles was good according to the above criteria, the environment in the furnace and the exhaust air duct was also good, and the exhaust air duct was not blocked.

Example 2

The same procedure was performed as in Example 1 except that the preheating temperature of nitrogen was set such that the difference ($\Delta T_1$) between the atmospheric temperature ($T_1$) at the height of the fiber bundles at the central position in the machine length direction in the section on the most incoming side and the supply temperature of nitrogen on the incoming side was 40° C. and that the supply temperature of nitrogen was set such that the difference ($\Delta T_2$) between the atmospheric temperature ($T_2$) at the height of the fiber bundles at the central position in the machine length direction in the section on the most outgoing side and the supply temperature of nitrogen on the outgoing side was 80° C. Under the above conditions, continuous operation was performed for 10 days without causing a serious problem during production. In addition, as a result of visually observing the obtained pre-carbonized fiber bundles and carbon fiber bundles, the fuzz quality of the carbon fiber bundles was good according to the above criteria, the environment in the furnace and the exhaust air duct was excellent, and no attached substance was observed in the exhaust air duct.

Example 3

The same procedure was performed as in Example 2 except that the flow rate of nitrogen on the incoming side was set such that the absolute value ratio ($|V_1|/|V_2|$) of the flow speeds of the inert atmosphere in the horizontal direction between the incoming side and the outgoing side was 1.5. Under the above conditions, continuous operation was performed for 10 days without causing a serious problem during production. In addition, as a result of visually observing the obtained pre-carbonized fiber bundles and carbon fiber bundles, the fuzz quality of the carbon fiber bundles was excellent according to the above criteria, the environment in the furnace and the exhaust air duct was also excellent, and no attached substance was observed in the exhaust air duct.

Example 4

The same procedure was performed as in Example 3 except that the preheating temperature of nitrogen was set such that the difference ($\Delta T_1$) between the atmospheric temperature ($T_1$) at the height of the fiber bundles at the central position in the machine length direction of the section on the most incoming side and the supply temperature of nitrogen on the incoming side was 150° C. Under the above conditions, continuous operation was performed for 10 days without causing a serious problem during production. In addition, as a result of visually observing the obtained pre-carbonized fiber bundles and carbon fiber bundles, the fuzz quality of the carbon fiber bundles was excellent according to the above criteria, the environment in the furnace and the exhaust air duct was good, and the exhaust air duct was not blocked.

Comparative Example 1

When the flow rate of nitrogen on the incoming side was set so that the absolute value ratio ($|V_1|/|V_2|$) of the flow speeds of the inert atmosphere in the horizontal direction between the incoming side and the outgoing side was 0.5, from the dynamic pressure measurement result, it was judged that the flow of the inert atmosphere from the position ($P_{300}$) on the most outgoing side in the machine length direction at which the atmospheric temperature in the heat treatment furnace was 300° C. to the inert gas supply port on the incoming side included flows in 2 directions, which were the traveling direction of the fiber bundles and the counter flow direction. Except for the above, the same procedure as in Example 3 was carried out, but under the above conditions, the internal pressure in the heat treatment furnace in which the pre-carbonization treatment was carried out during production constantly increased, a decomposition product produced by gasification of tar or the like blew off from the openings of the incoming port and outgoing port, and it was determined that operation was impossible and the furnace was stopped. As a result of visually observing the obtained pre-carbonized fiber bundles and carbon fiber bundles, the fuzz quality of the carbon fiber bundles was poor according to the above criteria, the environment in the furnace and the exhaust air duct was also poor, and the exhaust air duct was blocked.

TABLE 1

| | Flow of an Inert Atmosphere in the Heat treatment Furnace from a Position at which Atmospheric Temperature in Heat Treatment Furnace is 300° C., the Position being on the Most Outgoing Side in Machine Length Direction, up to the Inert Gas Supply Port on the Incoming Side | $\Delta T_1$ (° C.) | $\Delta T_2$ (° C.) | $\lvert V_1 \rvert / \lvert V_2 \rvert$ | Operatability at Production Fuzz Quality | Operatability at Production Environment of Inside Heat Treatment Furnace & Exhaust Air Duct |
|---|---|---|---|---|---|---|
| Example 1 | Only Parallel Direction to a Travel Direction of the Fiber Bundle | 150 | 150 | 2.5 | Good | Good |
| Example 2 | Only Parallel Direction to a Travel Direction of the Fiber Bundle | 40 | 80 | 2.5 | Good | Exellent |
| Example 3 | Only Parallel Direction to a Travel Direction of the Fiber Bundle | 40 | 80 | 1.5 | Exellent | Exellent |
| Example 4 | Only Parallel Direction to a Travel Direction of the Fiber Bundle | 150 | 80 | 1.5 | Exellent | Good |
| Comparative Example 1 | Parallel & Countercurrent Directions to a Travele Direction of the Fiber Bundle | 40 | 80 | 0.5 | Bad | Bad |

The present invention can be suitably used for manufacturing a carbon fiber bundle, and the stabilized fiber bundle and carbon fiber bundle obtained by the present invention can be suitably applied to aircraft applications, industrial applications such as pressure vessels and windmills, sports applications such as golf shafts, and the like, but the application range is not limited thereto.

DESCRIPTION OF REFERENCE SIGNS

1: Heat treatment furnace in which pre-carbonization treatment is performed
2: Incoming port of heat treatment furnace in which pre-carbonization treatment is performed
3: Outgoing port of heat treatment furnace in which pre-carbonization treatment is performed
4: Heat treatment chamber of heat treatment furnace in which pre-carbonization treatment is performed
5: Fiber bundle
6: Inert gas supply port
7: Heater
8: Exhaust port
9: Exhaust air duct
10: Exhaust gas treatment device
11: Opening of incoming port of heat treatment furnace in which pre-carbonization treatment is performed
12: Measurement point of each measurement
13: Central position in machine length direction of section on most incoming side in heat treatment furnace in which pre-carbonization treatment is performed
14: Central position in machine length direction of section on most outgoing side in heat treatment furnace in which pre-carbonization treatment is performed
$P_{300}$: Position on most outgoing side in machine length direction at which atmospheric temperature in heat treatment furnace is 300° C.

The invention claimed is:

1. A method for manufacturing a carbon fiber bundle, the method comprising:

a stabilization process of subjecting an acrylic fiber bundle to a heat treatment within a range of 200° C. to 300° C. in an oxidizing atmosphere;

a pre-carbonization process of performing a heat treatment within a range of 300° C. to 1,000° C. using a heat treatment furnace having at least one inert gas supply port on each of an incoming side and an outgoing side of the fiber bundle and at least one exhaust port between the incoming-side and outgoing-side inert gas supply ports, the heat treatment being performed with a temperature of an inert gas supplied being higher on the outgoing side than on the incoming side; and a carbonization process of performing a heat treatment at a temperature of 1,000° C. to 2,000° C. in an inert gas atmosphere, wherein, from a position at which an atmospheric temperature in the heat treatment furnace is 300° C., the position being on the most outgoing side in a machine length direction, up to the inert gas supply port on the incoming side, a flow of an inert atmosphere within the heat treatment furnace in the pre-carbonization process consists only of a flow in a parallel flow direction with respect to a travel direction of the fiber bundle in the machine length direction.

2. The method for manufacturing a carbon fiber bundle according to claim 1, wherein the pre-carbonization process is performed in the heat treatment furnace having 3 or more sections in which temperature control is possible in the machine length direction, and the temperature of the inert gas supplied to the heat treatment furnace satisfies 2 conditions below, where $T_1$ [° C.] represents an atmospheric temperature at a fiber bundle height at a central position in the machine length direction in a section that is on the most incoming side with respect to the machine length direction of a heat treatment chamber, and $T_2$ [° C.] represents an atmospheric temperature at a fiber bundle height at a central position in the machine length direction in a section that is on the most outgoing side with respect to the machine length direction of the heat treatment chamber:

temperature range of inert gas supplied on incoming side [° C.]: $|T_1-(\text{temperature of inert gas supplied on incoming side})|=\Delta T_1 \leq 50$, and temperature range of inert gas supplied on outgoing side [° C.]: $|T_2-(\text{temperature of inert gas supplied on outgoing side})|=\Delta T_2 \leq 100$.

3. The method for manufacturing a carbon fiber bundle according to claim 1, wherein a cross-sectional area is substantially uniform in the machine length direction of the heat treatment furnace in the pre-carbonization process, and an absolute value ratio ($|V_1|/|V_2|$) of a flow speed $V_1$ described below to a flow speed $V_2$ described below satisfies $0.5 \leq |V_1|/|V_2| \leq 2.0$, where $V_1$ [m/s] is a flow speed of the inert atmosphere in a horizontal direction at a central position in the machine length direction of a section on the most incoming side with respect to the machine length direction of the heat treatment chamber, and $V_2$ [m/s] is a flow speed of the inert atmosphere in the horizontal direction at a central position in the machine length direction in a section on the most outgoing side with respect to the machine length direction of the heat treatment chamber.

* * * * *